US012612882B2

(12) United States Patent
Lei et al.

(10) Patent No.: US 12,612,882 B2
(45) Date of Patent: Apr. 28, 2026

(54) PISTON FOR A FUEL ENGINE WITH INSTALLED BEARINGS

(71) Applicant: Changchun Xincheng Automation Machinery Equipment Co., LTD, Changchun (CN)

(72) Inventors: Lin Lei, Changchun (CN); Pengchao Zhang, Songyuan (CN)

(73) Assignee: Changchun Xincheng Automation Machinery Equipment Co., LTD, Changchun (CN)

( * ) Notice: Subject to any disclaimer, the term of this patent is extended or adjusted under 35 U.S.C. 154(b) by 166 days.

(21) Appl. No.: 18/354,006

(22) Filed: Jul. 18, 2023

(65) Prior Publication Data

US 2023/0358190 A1 Nov. 9, 2023

(30) Foreign Application Priority Data

May 11, 2023 (CN) ......................... 202321123212.X

(51) Int. Cl.
*F02F 3/00* (2006.01)
*F16C 29/00* (2006.01)
*F16J 9/00* (2006.01)

(52) U.S. Cl.
CPC .............. *F02F 3/00* (2013.01); *F16C 29/008* (2013.01); *F16J 9/00* (2013.01); *F16C 2360/22* (2013.01)

(58) Field of Classification Search
CPC ....... F02F 3/00; F16C 29/008; F16C 2360/22; F16C 29/005; F16J 9/00; F16J 1/006; F16J 1/04
See application file for complete search history.

(56) References Cited

U.S. PATENT DOCUMENTS

2003/0106525 A1 6/2003 Morgillo et al.
2011/0146613 A1 6/2011 Oxborrow et al.
2013/0019838 A1 1/2013 Lee et al.

FOREIGN PATENT DOCUMENTS

CN 203742820 U * 7/2014
EP 0069578 A1 * 1/1983 ............ F02F 3/0023

OTHER PUBLICATIONS

Machine Translation of CN 203742820 U PDF File Name: "CN203742820U_Machine_Translation.pdf" (Year: 2014).*
Machine Translation of EP 0069578 A1 PDF File Name: "EP0069578A1_Machine_Translation.pdf" (Year: 1983).*

* cited by examiner

*Primary Examiner* — Lindsay M Low
*Assistant Examiner* — Ruben Picon-Feliciano
(74) *Attorney, Agent, or Firm* — Zhigang Ma

(57) ABSTRACT

This invention is a fuel engine piston with installed bearings and belongs to the field of automotive engine components, specifically relating to a piston for a fuel engine. It includes a piston body, outer arc bearings, pin shaft bolts and sealing rings. It provides a piston for a fuel engine with bearings. The bearings on the piston enable rolling friction during piston operation, replacing sliding friction. This reduces the friction between the piston and the engine cylinder liner, decreases the energy consumption required to overcome friction, and reduces wear on the piston caused by sliding friction.

3 Claims, 2 Drawing Sheets

PISTON FOR A FUEL ENGINE WITH INSTALLED BEARINGS

TECHNICAL FIELD

This invention belongs to the field of automotive engine components, specifically relating to a piston for a fuel engine.

BACKGROUND

In the current existing technology, the piston of a fuel engine slides and friction occurs inside the engine chamber, generating more heat and mechanical losses, which is unfavorable for energy efficiency and environmental protection.

Therefore, a targeted solution is needed to address these issues. During operation, the piston is subjected to reacting forces from the connecting rod, which continuously swings and exerts significant lateral forces on the piston in a direction of non-piston axis. As a result, this lateral force generates considerable frictional force, and even when lubricated with engine oil, the sliding friction between the piston and the cylinder liner is still greater than the rolling friction, resulting in the loss of engine torque and power.

Therefore, a targeted solution is needed to address these issues.

SUMMARY

The technical issue to be solved by this invention is to provide a piston for a fuel engine that overcomes the frictional mode of the existing technology.

A piston for a fuel engine with installed bearings, characterized by: the piston body is equipped with outer arc bearings (a rolling element).

The piston body has installation grooves, wherein the installation grooves are provided with outer arc bearings through pin shaft bolts, and the outer wall outermost point of outer arc bearings protrude from the outer wall of the piston body. The outer arc bearings serve as rolling elements that reciprocate and roll on the inner wall of the engine cylinder liner, with the rolling direction parallel to the axis of the piston body.

Sealing rings are provided on the outer wall of the piston body, same as existing piston technology.

The number of installation grooves is four.

The number of outer arc bearings provided in each installation groove is more than one, preferably two, so that the piston body does not swing during operation.

Both ends of the inner ring of each outer arc bearing are provided with a shim. The pin shaft bolt passes through the shims and the outer arc bearing and fixes them on the piston body.

Each outer arc bearing is equipped with two shims.

The axis of the outer arc bearing is perpendicular to the axis of the piston body, and the two end faces of the outer arc bearing are symmetrical with respect to the axis of piston body, so that the rolling direction of the outer arc bearing is parallel to the axis of piston body.

Through the above design, this invention achieves the following beneficial effects: It offers a fuel engine piston equipped with outer arc bearings (a type of rolling element) on the piston body. During operation, the outer walls of the outer arc bearings reciprocate and roll against the inner wall of the engine cylinder liner. By selecting appropriate materials for the outer arc bearings and the engine cylinder liner, such as high-speed steel, their wear resistance and hightemperature resistance meet the operational conditions of the engine. This achieves the goal of replacing sliding friction with rolling friction. The substitution of rolling friction for sliding friction reduces the friction coefficient between the piston and the engine cylinder liner, thereby decreasing the energy consumption required to overcome friction.

BRIEF DESCRIPTION OF THE DRAWINGS

By combining the accompanying drawings and the detailed description of the preferred embodiments, the invention is further described as below.

Figure 1:
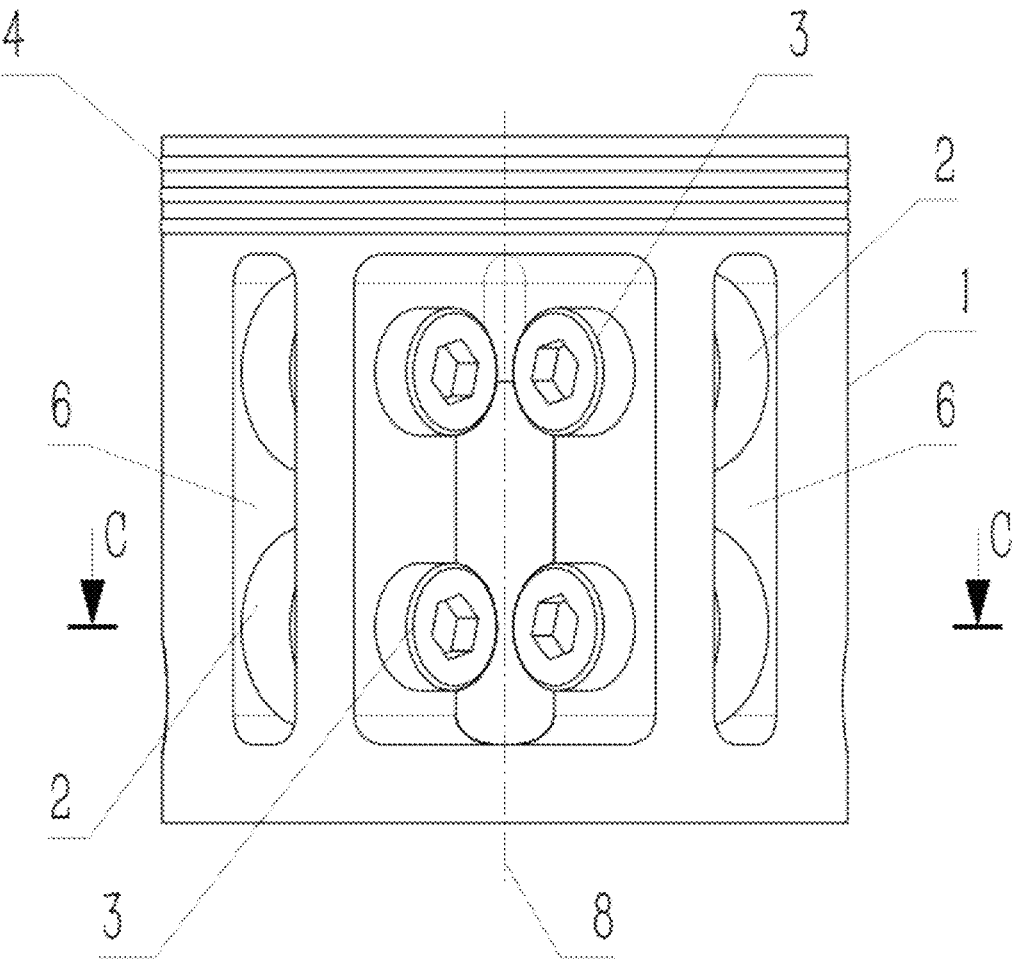
FIG. 1 is a schematic diagram of the structure of this invention.
Figure 2:
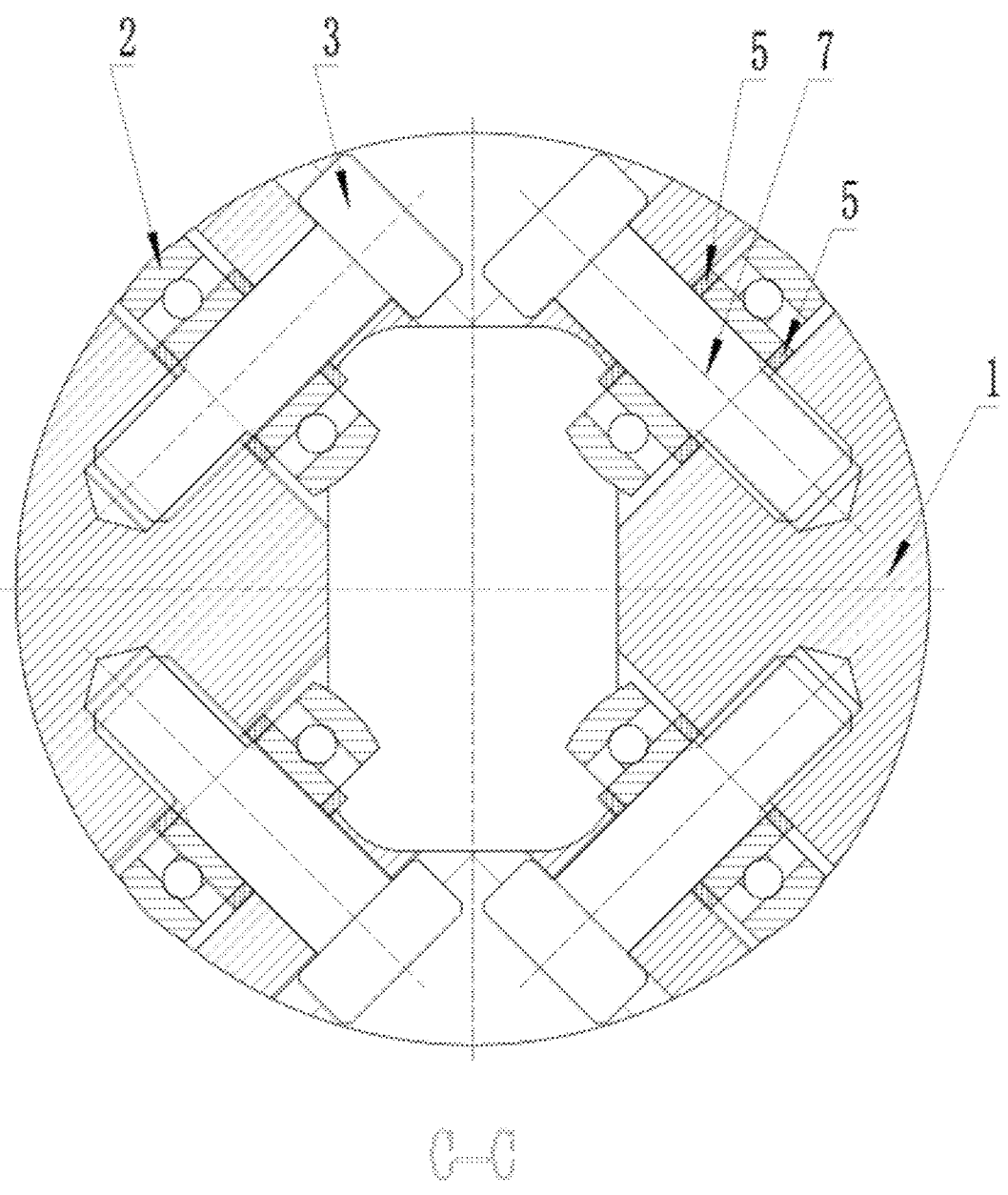
FIG. 2 is a cross-sectional view of FIG. 1 along the CC direction.

Wherein: 1—piston body, 2—outer arc bearing, 3—pin shaft bolt, 4—sealing ring, 5—shim, 6—installation groove, 7—axis of the outer arc bearing, 8—axis of the piston body.

DETAILED DESCRIPTION OF THE EMBODIMENTS

The invention is further described in conjunction with the accompanying drawings:

A piston for a fuel engine with installed bearings, characterized by: the piston body (1) is equipped with outer arc bearings (a rolling element).

The piston body (1) has installation grooves, wherein the installation grooves (6) are provided with outer arc bearings (2) through pin shaft bolts (3), and the outer wall outermost point of outer arc bearings (2) protrude from the outer wall of the piston body (1). The outer arc bearings (2) serve as rolling elements that reciprocate and roll on the inner wall of the engine cylinder liner, with the rolling direction parallel to the axis (8) of the piston body (1).

Sealing rings (4) are provided on the outer wall of the piston body (1), same as existing piston technology.

The number of installation grooves (6) is four.

The number of outer arc bearings (2) provided in each installation groove (6) is more than one, preferably two, so that the piston body (1) does not swing during operation.

Both ends of the inner ring of each outer arc bearing (2) are provided with a shim (5). The pin shaft bolt (3) passes through the shims (5) and the outer arc bearing (2) and fixes them on the piston body (1).

Each outer arc bearing (2) is equipped with two shims

The axis (7) of the outer arc bearing (2) is perpendicular to the axis (8) of the piston body (1), and the two end faces of the outer arc bearing (2) are symmetrical with respect to the axis (8) of the piston body (1), so that the rolling direction of the outer arc bearing (2) is parallel to the axis (8) of the piston body (1)

Example Implementation

The number of installation grooves (6) is four, distributed on the side surface of the piston body (1), and each installation groove (6) is provided with more than one outer arc bearings (2), the rotational direction of the outer arc bearing (2) is parallel to the axis of the piston body (1), ensuring that the outer wall of outer arc bearings (2) on the piston body (1) can roll friction with the engine cylinder liner;

The outer arc bearings (2) are installed in the installation grooves (6) through pin shaft bolts (3), both ends of the inner ring of each outer arc bearing (2) are provided with a shim (5), The pin shaft bolt (3) passes through the shims (5) and the outer arc bearing (2) and fixes them on the piston body (1). The shims (5) provide axial positioning for the inner ring of the outer arc bearings (2), ensuring that the outer ring of the outer arc bearings (2) does not contact the piston body (1) to prevent unnecessary friction, at the same time, it can prevent the piston body (1) from deformation when the pin shaft bolt (3) is tightened.

The sealing ring (4) is a piston sealing ring, used to ensure the sealing between the piston body (1) and the engine cylinder liner, same as existing piston technology.

The outer circumference of the piston body (1) does not participate in friction, reducing the friction between the piston and the cylinder liner.

What is claimed is:

1. A piston for a fuel engine with installed bearings, comprising:
    a piston body equipped with outer arc bearings,
    wherein said outer arc bearings are a type of rolling elements,
    wherein the piston body has installation grooves, wherein the installation grooves are provided with the outer arc bearings, and
an outermost point of the outer arc bearings protrudes from an outer wall of the piston body,
where the longitudinal axis of the outer arc bearings is perpendicular to the longitudinal axis of the piston body, and two end faces of the outer arc bearing are symmetrical with respect to the longitudinal axis of the piston body, so that a rolling direction of the outer arc bearing is parallel to the longitudinal axis of the piston body.

2. A piston for a fuel engine with installed bearings according to claim 1, characterized in that the number of installation grooves (6) is four.

3. A piston for a fuel engine with installed bearings according to claim 1, characterized in that the number of outer arc bearings (2) provided in each installation groove is more than one, preferably two, so that the piston body does not swing during operation.

* * * * *